F. N. CRONHOLM.
PIPE COUPLING.
APPLICATION FILED NOV. 8, 1909.
969,943.
Patented Sept. 13, 1910.
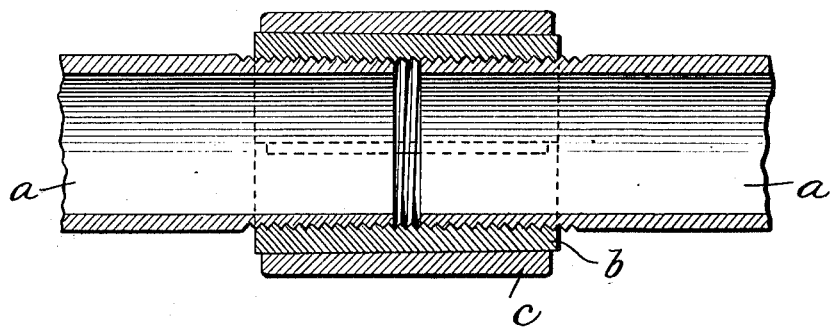
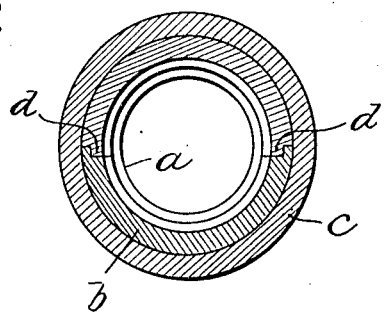
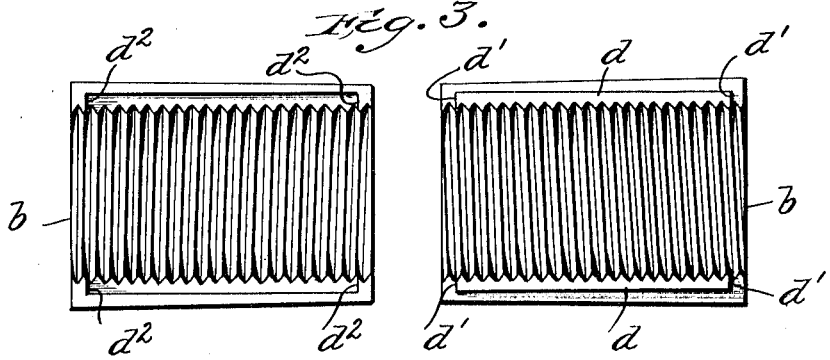
Witnesses:
Edwin L. Yewell
A. B. Bridges
Inventor
Frederick N. Cronholm,
By Davis & Davis,
Attorneys.

UNITED STATES PATENT OFFICE.

FREDERICK N. CRONHOLM, OF NACHES, WASHINGTON.

PIPE-COUPLING.

969,943. Specification of Letters Patent. Patented Sept. 13, 1910.

Application filed November 8, 1909. Serial No. 526,845.

*To all whom it may concern:*

Be it known that I, FREDERICK N. CRONHOLM, a citizen of the United States of America, and a resident of Naches, county of Yakima, State of Washington, have invented certain new and useful Improvements in Pipe-Couplings, of which the following is a full and clear specification, reference being had to the accompanying drawings, in which—

Figure 1 is a longitudinal section; and Fig. 2 is a transverse section of my improved coupling; Fig. 3 is a plan view of the two sections composing the coupling sleeve, these two sections being separated and a view being taken looking into their threaded interiors.

This invention relates to that class of pipe couplings in which the adjacent ends of the pipe-sections are externally threaded and joined by an internally threaded sleeve which is split longitudinally into two equal sections whose longitudinal edges abut against each other their full length, these sections being slightly tapered externally so that they may be clamped in place with their threads interlocked with the threads of the pipe-sections by an internally correspondingly-tapered sleeve adapted to be driven endwisely onto the sectional coupling-sleeve, whereby a coupling of sufficient length and strength and tightness is obtained without the labor incident to screwing the pipe-sections into the coupling-sleeve the entire distance of the thread engagement, as is obvious. This type of coupling is especially adapted to pipe-lines of large diameter as in laying large pipes the time and labor of screwing the sections home into the coupling-sleeves is an important factor.

The object of my invention is to so interlock the longitudinal abutting edges of the coupling-sleeve sections that they cannot be forced out of alinement when the sleeve is jammed thereon, thus insuring the preservation of the exact alinement of the abutting or adjoining edges of the threads of the two sections so that the coupling or the pipe-sections may be readily given the few turns necessary to screw the pipe-sections home after the clamp-sleeve is driven home.

A further object is to so construct the threaded sections of the coupling sleeve that should the pipe sections be tightened excessively leakage will be prevented at the joints between the coupling sleeve sections.

In the drawings, *a* designates the pipe-sections externally threaded, *b* the longitudinally - divided coupling - sleeve externally tapered, and *c* the internally-tapered clamp-sleeve. In attaching this coupling the ends of the pipes are first laid in one of the halves of the coupling-sleeve; the other half is then placed over the ends of the pipes, with the threads interlocking in the same manner as though the ends of the pipe had been screwed into the coupling-sleeve; then the clamp-sleeve is driven on to clamp the abutting edges of the coupling-sections hard against each other; and then the pipes, or the coupling itself are given the few final turns necessary to tighten the joint.

It will be observed that if there is even a slight inequality in the fit between the clamp-sleeve and the coupling-sleeve the tendency will be to force the sections of the latter out of alinement and thus destroy the continuity of the threads thereof and make it difficult if not impossible to screw the parts home to a tight fit. I avoid this by so interlocking the abutting edges of the coupling-sleeve that exact alinement is preserved. The preferred way of doing this is to provide the inner corners of one of the sections of the coupling sleeve with longitudinal ribs *d* and the opposite section with corresponding longitudinal recesses or grooves, so that the oppositely facing shoulders of these ribs and grooves shall abut against each other, these abutting shoulders lying just outside of the bottoms of the threaded grooves and running nearly the full length of the coupling sleeve. In this way any unequal pressure of the jam-sleeve on the coupling sleeve sections will be taken up by the shoulders in the joints. Each of the ribs *d* terminates a little short of the end of the sleeve to form an abutment *d'* at each end of the rib, which abutment abuts against a similar shoulder $d^2$ at each end of the groove in the companion section, whereby should the sections be slightly separated by excessive tightening of the pipe sections the joint will still remain tight and thus prevent leakage. With this construction of the joint it is advantageous to have the jam-sleeve *c* practically as long as the coupling sleeve so that excessive tightening of the pipe sections will not separate the extreme ends of the coupling sleeve.

It is preferred to gradually taper the threaded portion of the pipe toward the end of the pipe to give a "draw" thereto, as this greatly facilitates the coupling operation in that it permits the coupling-sleeve sections to be more readily placed over the threaded ends of the pipe with their edges closely abutting. When thus tapered, the ends of the pipe will have only a loose fit in the coupling-sleeve when the same is placed thereon, but this lost motion will be all taken up when the parts are screwed tightly together.

Having thus fully described my invention, what I claim as new, and desire to secure by Letters Patent, is:

A pipe coupling, consisting of two pipe sections having their adjacent ends threaded, a coupling sleeve threaded internally and divided into sections longitudinally, the longitudinal edges of these sections being adapted to abut closely together and each pair of abutting edges being provided with a correspondingly-shaped rib and groove which extend nearly the full length of the coupling and have their longitudinal faces abutting closely together throughout their length and the ends of this rib and groove terminating in closely-abutting transverse shoulders, and a device embracing the sections of said coupling sleeve and clamping them together on the pipe sections.

In testimony whereof I hereunto affix my signature in the presence of two witnesses this 1st day of October 1909.

FREDERICK N. CRONHOLM.

Witnesses:
  PEARL BENJAMIN,
  DAVID RANKIN.